United States Patent [19]

Mimken

[11] 3,969,616

[45] July 13, 1976

[54] DIGITAL RANGE COMPUTER SYSTEMS FOR AIR NAVIGATION SYSTEMS SUCH AS TACAN

[75] Inventor: Frederick J. Mimken, Fairport, N.Y.

[73] Assignee: General Dynamics Corporation, St. Louis, Mo.

[22] Filed: June 29, 1965

[21] Appl. No.: 467,897

[52] U.S. Cl. .......................... 235/151.32; 343/7.3; 324/186; 324/188; 328/109
[51] Int. Cl.² ...................... G01S 9/18; H03K 5/20
[58] Field of Search ................. 235/151.32; 343/7.3; 324/68; 328/109

[56] References Cited
UNITED STATES PATENTS

| | | | |
|---|---|---|---|
| 3,246,324 | 4/1966 | Price | 343/7.3 |
| 3,267,464 | 8/1966 | Shames | 343/7.3 |

Primary Examiner—Malcolm A. Morrison
Assistant Examiner—Edward J. Wise
Attorney, Agent, or Firm—Martin LuKacher

[57] ABSTRACT

A digital range computer which may be incorporated in a Tacan air navigation set is described. The computer includes a calculation unit which calculates the range from information as to the elapsed time between interrogation and reply signals. The signals are inputed to the calculation unit via the input control and range gate control unit. Another control unit is operated by the calculation unit and generates synthetic reply signals on the basis of the calculations previously made. The synthetic reply signals are used in the control unit so as to maintain the calculation unit operational on a continual basis, notwithstanding the absence of reply signals. The synthetic reply signals are also utilized by an acquisition control unit in order to condition the system, either in a search or tracking mode of operation.

15 Claims, 7 Drawing Figures

INVENTOR.
FREDRICK J. MIMKEN

BY
ATTORNEY

DIGITAL RANGE COMPUTER SYSTEMS FOR AIR NAVIGATION SYSTEMS SUCH AS TACAN

The present invention relates to computer systems, and particularly to systems for computing the range between stations which are in radio communication with each other.

The invention is especially suitable for use in electronic navigation systems which include an interrogator station for transmitting interrogation signals and a transponder station for receiving such signals and retransmitting reply signals in response thereto. The stations may be located in mobile craft or at fixed locations. In a typical system, the interrogration station is located in an aircraft and the transponder station is at a fixed ground location, such as a landing field. A navigation system of the foregoing type, in which the invention is especially adapted for use, is known as TACAN, which is an acronym for tactical air navigating system.

Computer systems for TACAN and like electronic navigation systems, which are known in the art, have used analog computer elements such as resolvers and potentiometers, which are mechanically controlled for the purpose of making calculations based on the information contained in interrogation and reply signals. Such mechanically operated analog computers have been limited in speed of response, accuracy and reliability by virtue of their mechanical components. The size and weight of the computers is also undesirably limited by their mechanical components, particularly for airborne applications.

In electronic navigation systems including interrogator and transponder stations there may be an abundance of extraneous reply signals, which are received by the receiver at the interrogation station. These extraneous signals result, in part, from replies which are transmitted by the transponder to many interrogator stations, which are attempting to communicate with the transponder station. In addition, the transponder station may continually transmit pulses, called "squitter" pulses, which are used by the interrogator station for various purposes, such as bearing measurements. Noise sources also emanate pulses which may be similar in appearance to transponder station replies. The range reply signals must be differentiated from all such extraneous signals, in order to accurately compute range between stations from the range reply signals.

Missing reply signals are another problem in interrogator-transponder navigation systems. The transponder, such as a ground beacon which is used in TACAN, may use a certain portion of its transmission cycle to transmit signals other than reply signals. During this period of time, reply information is not available for use in range computations. In the case of TACAN, a transponder, such as a ground beacon, transmits 3,600 pulse pairs per second. During portions of each second, when some 900 of these pulse pairs are transmitted, the transponder does not respond to interrogations, but utilizes these 900 pulses in order to transmit azimuth reference signals. In addition, portions of each transmission cycle are reserved for the transmission of identity code signals which are Morse code transmissions and which identify the particular transponder station. Thus, known TACAN systems often fail to track a desired beacon. Range information may be lost while a search for the beacon is undertaken.

It is desirable that the range computer search for and acquire the reply signals from a selected transponder station, within a short period of time, e.g., approximately 1.0 second in the case of high speed aircraft, in spite of the reception of squitter pulses and other extraneous signals and notwithstanding missing reply signals. After the reply signals are located and the selected transponder station is found, the station is desirably continuously tracked so that the range information may be continually updated by the computer. The absence of reply pulses from the transponder station may be encountered during tracking and presents significant problems in the case of a computer which does not include mechanical elements with sufficient inertia to accommodate missing replies, albeit at a loss in accuracy.

Another problem in transponder-interrogator electronic navigation systems is the effect of time variations or "jitter" of the reply pulse. Such jitter may result from propagation characteristics of the radio link or variations in delay between reception and transmission in the transponder station. Since range information is a function of the time interval between the time of transmission of an interrogation signal and the time of reception of a reply signal, such time jitter is detrimental to the accuracy of the range computation. It is therefore desirable, particularly in TACAN systems which are used in high speed aircraft, that the systems be accurate in spite of jitter of the same order of magnitude as the accuracy of the range measurement.

Accordingly, it is an object of the present invention to provide improved computer systems especially adapted for navigation purposes in which the foregoing problems and disadvantages are substantially eliminated.

It is a further object of the present invention to provide an improved computer for use in electronic navigation systems which include interrogator and transponder stations, which system is capable of measuring range between such stations without the need for mechanically movable parts.

It is still further object of the present invention to provide an improved range computer for electronic navigation systems including interrogator and transponder stations, which computer is capable of measuring range between such stations with a higher degree of accuracy than prior navigation systems.

It is still further object of the present invention to provide a computer system for electronic navigation purposes, which is capable for searching for and acquiring reply signals from a selected transmitting station within a shorter period of time than previous navigation systems.

It is a still further object of the present invention to provide a range computer system for TACAN and like electronic navigation systems which makes extensive use of digital circuit elements and is of lighter weight, smaller size and greater reliability than electronic navigation systems heretofore available.

It is a still further object of the present invention to provide a digital range computer for TACAN and like electronic systems which provides accurate measurements in spite of missing reply pulses, viz. in applications wherein the reply pulse efficiency is relatively low.

It is a still further object of the present invention to provide a digital range computer for TACAN and like navigation systems which is effective in providing accurate measurements under conditions where extraneous pulses are present and under otherwise poor signal to noise conditions.

It is a still further object of the present invention to provide a digital range computer for TACAN and like navigation systems which is effective in providing accurate range measurements in spite of time instability or jitter of reply pulses.

It is a still further object of the present invention to provide a range computer for TACAN and like navigation systems which is capable of tracking a desired transponder station in the absence of a large number of successive reply signals and even while identity tones are being transmitted by that transponder station.

Briefly described, a computer system embodying the invention includes a calculation unit for producing a number corresponding to the elapsed time between an interrogation signal and a reply signal, which are applied to the computer system. The reply signal may be in the form of a pulse. The computer system also includes a plurality of control units which are responsive to the interrogation and reply signals and to calculations registered in the calculation unit between successive cycles of interogation and reply signals. An interrogation-reply signal cycle is referred to hereinafter as a "dwell". One of the control units provides a synthetic reply pulse which is called a filler pulse, on the basis of the calculations made by the calculation unit on successive dwells. Another control unit, which is also responsive to such calculations, generates a range gate which opens during a selected period of time during each dwell in which reply signals are expected to arrive. An input control unit, which is operated by the filler pulses and by reply pulses which are passed during the period established by the range gate control unit maintains the calculation unit operation in a continual fashion, notwithstanding the absence of reply signals. A search or acquisition control unit is responsive to the filler pulses and the reply signals which are passed during the range gate intervals for controlling both the range gate control unit and the calculation unit in a manner to provide different modes of operation thereof (viz. a search phase and a tracking mode of operation). The acquisition control unit reads out the calculating unit upon receipt of successive reply pulses during the tracking mode of operation and prevents read-out during the search mode. The range calculation is therefore updated at the end of each dwell.

The input control unit may include means responsive to the time of occurrence of the filler pulse and an actual reply pulse for supplying velocity information to the calculation unit on the basis of which accurate range calculation can be made in spite of reply jitter. A velocity detector may be included in the input control unit which provides an error signal having a sense and magnitude corresponding to the sense and magnitude of difference between the expected time of occurrence of a reply pulse (i.e. the time of occurrence of the filler pulse) and the actual time of occurrence of a reply pulse. This error signal is averaged over a number of dwells and used to correct the information which is supplied to the calculation unit of the range computer. The use of velocity averaged error signals has also been found to facilitate range computer operation, even in the absence of a succession of reply pulses, such as may occur while the range computer system is tracking during the transmission of an identity tone by the replying transponder station.

The invention itself, both as to its organization and method of operation, as well as additional objects and advantages thereof will become more readily apparent from a reading of the following description in connection with the accompanying drawings in which.

Figure 1:
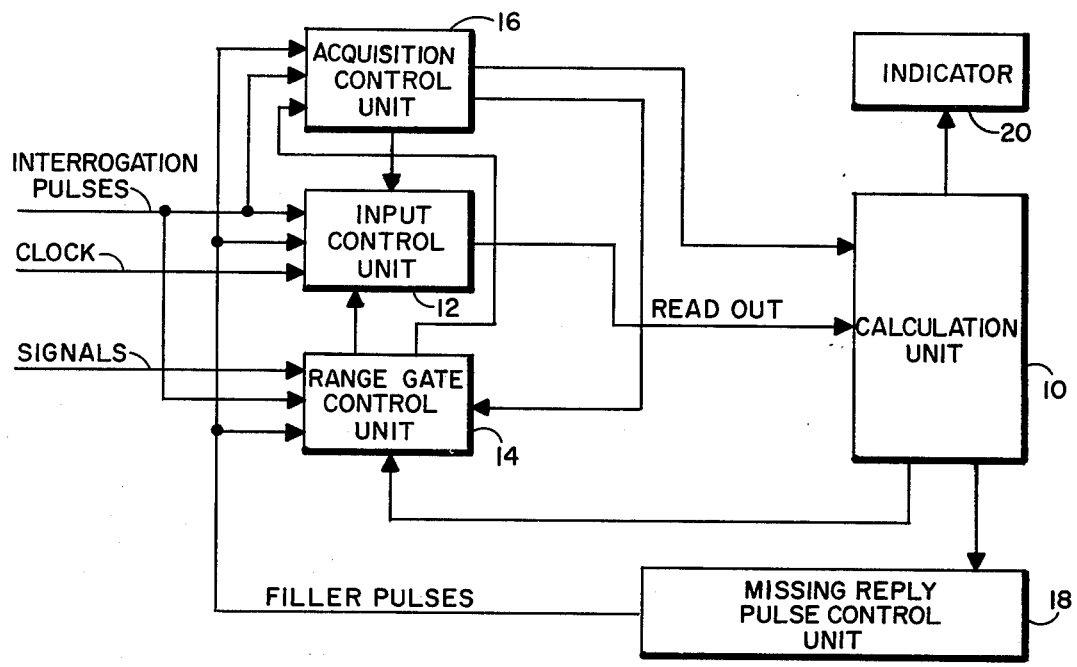
FIG. 1 is a simplified block diagram of a range computer system in accordance with the present invention.
Figure 2:
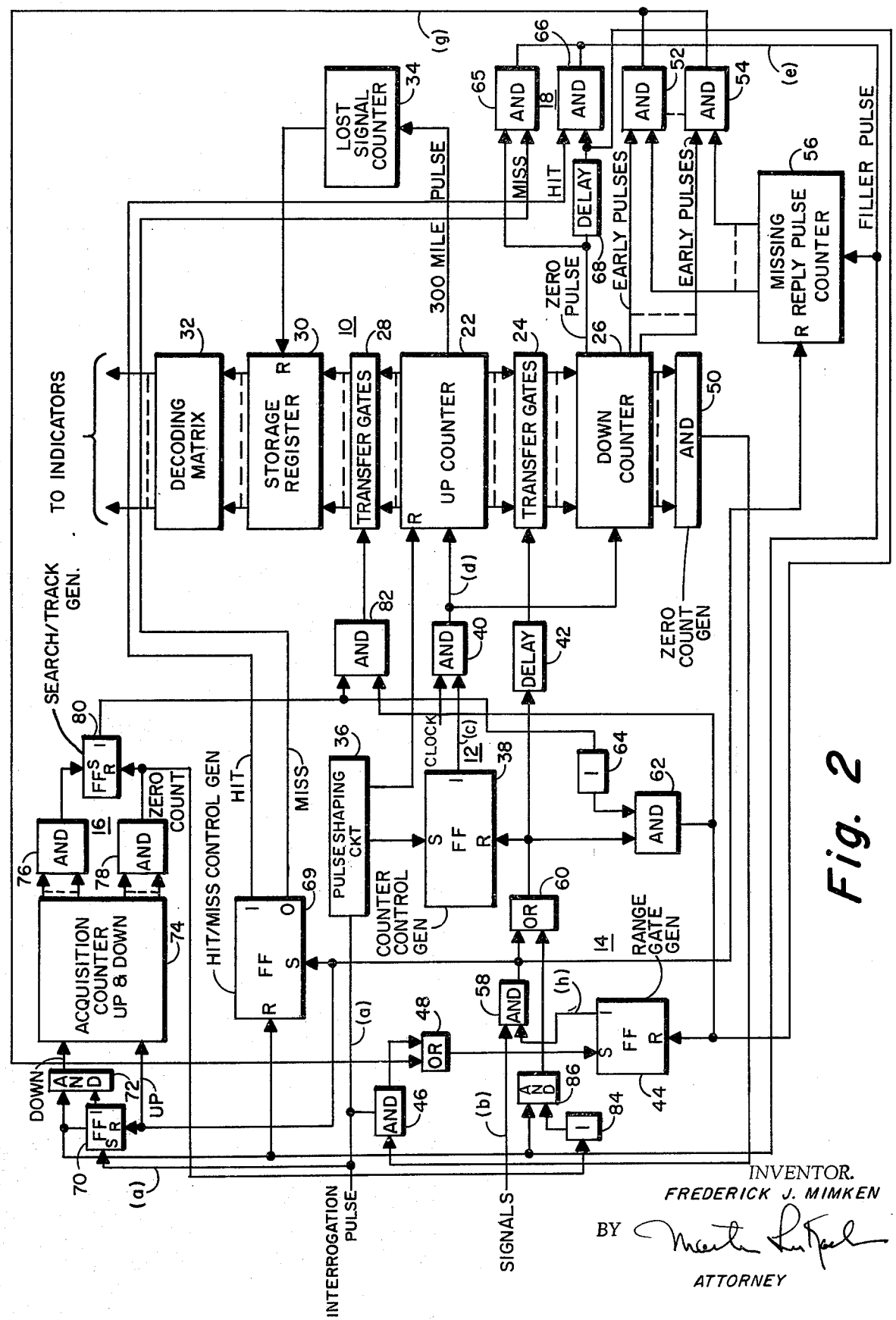
FIG. 2 is a more detailed block diagram of the system shown in FIG. 1.

Referring more particularly to the drawings, there is shown in FIGS. 1 and 2 a range computer system which is adapted to be used in an airborne TACAN set. As the description proceeds, it will be apparent that the computer system may substantially entirely be constructed from digital circuit elements, such as gates and filp-flops. These circuits are available as microelectronic circuit components, which are highly reliable and very small in size. Accordingly, a range computer embodying the invention may be very small in size as compared to range computers of the type previously used in TACAN and like electronic navigation systems.

It will further become apparent as the description proceeds, that mechanical variable elements, such as motor drives, potentiometers and relays and resolvers are eliminated, thereby further enhancing the reliability and reducing the size of the range computer system range computers that have heretofore been available. Reference may be had to the text Electronic Avigation Engineering by Peter C. Sandretto, especially Chapters 10 and 12 thereof, for further information with respect to range computers of the type known in the art. This text also describes the modulating and tuner circuits, which respectively provide the interrogation pulse and receive the reply and other signals which are used as inputs to the range computer.

The range computer system, as shown in FIG. 1, includes several subsystems; namely, a calculation unit 10, an input control unit 12, a range gate control unit 14, an acquisition control unit 16 and a missing reply pulse control unit 18. The calculation unit is read out into an indicator 20. Interrogation pulses from the TACAN transmitter operate the input control unit 12 and provide for the transmission of the clock pulses to the calculation unit 10. The clock pulses desirably have a frequency related to the round trip travel time of the interrogation pulses from the interrogator station to the transponder station and back from the transponder station to the interrogator station. A clock frequency of 8.092 megacycles, which has a pulse spacing corresponding to 0.01 miles of range, has been found suitable. The calculation unit 10 includes digital circuits for counting the clock pulses until such time as a signal, which is desirably a reply pulse from the transponder station, is passed by the range gate control unit 14 to the input control unit 12, so as to stop the transmission of clock pulses to the calculation unit 10. On the initial dwell, the range gate control unit is responsive to the interrogation pulses, so that the input control unit will stop the transmission of clock pulses upon occurrence of the first signal received after the initial interrogation pulse is transmitted.

On subsequent dwell, the calculation unit controls the range gate control unit 14, so as to permit the passage of signals during a finite period of time during a dwell, based upon the time of occurrence of a signal on the preceding dwell. The time period is called the "range gate".

The missing reply pulse control unit 18 receives an output from the calculation unit 10 when a reply pulse is indicated as being missing based upon information stored in the calculation unit during a preceding dwell. The missing reply pulse control unit 18 generates a synthetic reply pulse, which is referred to hereinafter as a filler pulse, to take the place of a missing reply pulse. The filler pulse operates the input control unit 12 and the range gate control unit 14 as though it were an actual reply pulse. Accordingly, the calculation unit 10 continues to operate to provide the same range readout over a number of missing reply pulses. The calculation unit 10 also responds to the loss of reply pulses for a certain number of dwells and thereafter indicates that the transponder unit, which had previously been supplying the reply signals, has been lost.

The filler pulses also operate the acquisition control unit 16. Either reply signals, which are indicated by the range gate control unit 14 as being valid replies, or filler pulses which are received from the missing pulse control unit 18, are present during each dwell; the start of which is recognized by the acquisition control unit from the interrogation pulses, which are applied thereto. The acquisition control unit calculates a number, say 6, corresponding to six reply signals, as being indicative of the acquisition of a selected transponder. This number is incremented by the range gated replies to the unit 16 and decremented by the filler pulses. When the desired number is indicated, the range computer is switched by the acquisition unit 16 from a search mode to a tracking mode of operation. In the event that the computer is operating in the tracking mode and a number of missing reply pulses are received which is sufficient to decrement the number calculated by the acquisition control unit 16 to a certain extent, the loss of the reply signal is recognized and the unit 16 reconditions the computer to the search mode of operation.

The acquisition control unit 16 operates the range gate control unit 14 to prevent the filler pulses from operating the range gate control unit 14 during the search mode of operation so as to prematurely end the range gate. Also, the acquisition control unit 16 conditions the calculation unit 10 to read out the range calculation unit once per dwell during the tracking mode of operation. An indicator 20, which may be a digital to an analog converter, converts a digital output provided by the calculation unit into an analog signal for driving a meter of the type used in TACAN systems. Alternatively, a digital readout device, such as used in digital voltmeters, may be used as the indicator 20 to display the range calculation.

Referring to FIG. 2, the calculation unit 10 is illustrated as including an up counter 22, the output of which may be transferred by way of transfer gates 24 to a down counter 26. Other transfer gates 28 read out the up counter output into a storage register 30. When the transfer gates 28 are enabled, the output of the storage register is converted by a decoding matrix 32 into a digital code which may be displayed either on a digital indicating device or applied to a digital to analog converter for producing an analog signal which may be displayed on an analog indicating device or display.

The up counter 22 may be a binary coded decimal counter which counts up to 300,000 clock pulses and then resets itself to zero. Because of the clock frequency mentioned above, 300,000 clock pulses correspond to 300 miles of range between the interrogator station and the transponder station. A pulse which is derived from the last up counter stage in response to the 300,000th pulse is therefore indicative of a range of 300 miles. This pulse is applied to another counter 34 which has a capacity to count a certain number of 300 mile pulses, say eight such pulses. When the eight pulse is counted, the storage 30 is reset by the counter 34 output, so that the indicator will display the absence of an output and thereby show the loss of range information.

The down counter 26 may be a binary coded decimal counter of the same capacity as the up counter 22. The down counter 26, however, counts in a downward direction and decrements the count stored therein by one digit upon receipt of each input pulse thereto.

The storage register 30 may include a plurality of flip-flops which are set by the up counter outputs, which are transferred through the transfer gates 28. Each time the transfer gates 28 are enabled, the number stored in the storage register 30 is updated. As will be explained hereinafter, the number stored is updated once per dwell. This number represents the range which is calculated by the calculation unit 10.

The input control unit 12 includes a pulse shaping circuit 36 which receives the interrogation pulse and converts that pulse into a pair of pulses respectively occurring coincident with the leading and lagging edges of the interrogation pulse.

Differentiators and polarity sensitive amplifiers may be used in the pulse shaping circuit 36. The output corresponding to the leading edge of the interrogation pulse is applied to a reset input of the upcounter 22 and resets that counter at the beginning of each dwell, so that the count stored therein will initially be zero. The output corresponding to the lagging edge of the interrogation pulse is applied to a flip-flop 38 for setting the flip-flop. The flip-flop 38 is reset either by the range gated reply pulse or the filler pulse, as will be explained more fully hereinafter. The "1" output of the flip-flop 38 enables an AND gate 40, which transmits the clock pulses to the input of the up counter 32. Since the flip-flop 38 controls the counter 32, it is called a counter control generator flip-flop.

The input control unit also includes a delay circuit 42 to which the range gated reply pulses and filler pulses are applied. This delay circuit 42 may be a one shot multivibrator, which provides an output pulse, which is delayed a short interval of time. This delay permits the reply or filler pulse to reset the counter control generator flip-flop 38 before the transfer gates 24 are enabled.

The clock pulses are also transmitted through the AND gate 40 to the down counter and decrement the number transferred thereto through the gates 24 and stored therein.

The range gate control unit 14 includes a flip-flop 44 having a set input which receives the interrogation pulse by way of an AND gate 46 and an OR gate 48. The flip-flop 44 generates the range gate and may be called the range gate generator flip-flop. The AND gate 46 is enabled at the beginning of the initial dwell and otherwise when a zero count is accumulated in the down counter 26. This zero count is recognized by an AND gate 50, which is connected to the sides of the flip-flops of the down counter 26, which provides output levels when the down counter registers a zero count therein. The output of the AND gate 50 provides an enabling level to the AND gate 46.

The flip-flop 44 may also be set by an early pulse (viz. a pulse occurring at an interval prior to the expected time of occurrence of a reply pulse) which is obtained from the down counter 26. In order to produce early pulses, different stages of the down counter ahead of the stage which provides an output when the counter is decremented to zero by the input, clock pulses are connected to the inputs of different AND gates. Two such AND gates, 52 and 54, are shown by way of example.

The first AND gate 52 receives an input from a stage of the down counter 26 which is actuated a certain period of time before the down counter is decremented to zero. The other AND gate 54 receives an input from a stage of the down counter 26, which is actuated a somewhat longer period of time before the down counter 26 is decremented to zero. Of course, other AND gates may be provided which receive outputs from the down counter stages which are actuated at different periods of time before that counter 26 is decremented to zero.

The down counter 26 has stored therein, at the beginning of each dwell, the count which was accumulated in the up counter 22 during the previous dwell. As will be explained more fully hereinafter, this count corresponds to the time of reception of a reply or squitter signal during the preceding dwell. The down counter is therefore decremented to zero at the expected time of reception of a reply pulse, since replies are substantially synchronous with interrogations. The actuation of the AND gates 54 and 52 occur at different times in advance of the expected time of arrival of the reply pulse.

Because the stations are moving rapidly with respect to each other, the reply on the succeeding dwell should occur somewhat in different time relationship with the interrogation pulse than did the reply in the preceding dwell. The amount of alteration in the time relationship is dependent upon the relative speed of the stations. For example, an interrogator station in a relatively slow aircraft which is moving toward the transponder station may occur within tenths of microseconds of the time of arrival of the reply during the preceding dwell. A faster moving aircraft may expect to receive replies further in advance of the preceding dwell.

Accordingly, the first early pulse may suitably be a pulse which is produced by the down counter about three microseconds before the down counter 26 is decremented to zero. Another early pulse may suitably occur twelve microseconds in advance of the filler pulse.

The AND gates 52 and 54 are enabled by a counter 56, which counts missing reply pulses. These missing reply pulses are synthesized by filler pulses which are applied to the counter 56 from the missing reply control unit 18, which will be described in detail hereinafter.

The counter 56 is reset to zero when an actual reply pulse is received. The stage of the counter 56, which provides an output level when the counter 56 is reset to zero, is connected to the AND gate 52, which transmits the first, say 3 microsecond, early pulse. Accordingly, the first early pulse will be transmitted by the AND gate 52 under conditions where no pulses are missing. The counter 56 enables the AND gate 54 and the other AND gates, which are not shown, depending on the number of filler pulses which are successively counted.

The missing reply pulse counter 56 may suitably be a four stage binary counter, and two AND gates in addition to the gates 52 and 54 may be used.

After the initial dwell, the early pulse passes through the OR gate 48 and sets the flip-flop 44. The flip-flop 44 is reset by the signals which are transmitted through an AND gate 58, which is enabled when the flip-flop 44 is set. The AND gate 58 output passes through an OR gate 60 and another AND gate 62 to the reset terminal of the flip-flop 44. The AND gate 62 is enabled through an inverter 64 by an acquisition control unit 16, when that control unit conditions the computer in its search mode of operation. During the tracking mode of operation, the range gate flip-flop 44 is reset by a zero pulse or delayed filler pulse, which is produced by the down counter 26, after the down counter is decremented to zero. This delayed filler pulse is a reliable indication of the period of time after which no actual reply pulse would be encountered during the tracking mode of operation. The range gate flip-flop 44 is set during the period between the occurrence of the early pulse and the receipt of an actual reply pulse (during search) or a delayed filler pulse (during tracking). Since the flip-flop allows the reception of signals during this interval, it generates the range gate.

The missing reply pulse control unit 18 includes a pair of AND gates 65 and 66. The AND gate 65 is connected to the last stage of the down counter 26, which produces the zero pulse. The other AND gate 66 receives the zero pulse through a delay circuit 68 which may be a one-shot multivibrator which provides an output pulse after a delay of approximately 3 microseconds.

The zero pulse is produced during each dwell at the expected time of occurrence of the reply pulse, based upon the information stored in the calculation unit 10 during the preceding dwell. The zero pulse is also produced when a reply pulse is not received at or before its expected time of reception. When transmitted through either the AND gate 65 or the AND gate 66, the zero pulse provides a synthetic reply of filler pulse. The AND gate 65 and the AND gate 66 are respectively connected to the 1 and the 0 outputs of a flip-flop 69, which forms part of the missing pulse control unit 18. The flip-flop 68 is set by the output of the AND gate 58 in the range gate control unit 14. The AND gate 58 is enabled only during the range gate. Accordingly, signals which are transmitted through the AND gate 58, and which set the flip-flop 69, are range gated reply pulses, which occur during the range gate.

When the flip-flop 69 is set, it produces and stores a 1 output which indicates the reception of a reply pulse during a dwell. Such reception is referred to as a "hit". The flip-flop 69 is reset by the filler pulse which is transmitted either by the AND gate 65 or by the AND gate 66, and the flip-flop 69 produces and stores a 0 output to indicate a "miss", or the absence of a reply pulse during that dwell. On the succeeding dwell, the AND gate 65 is enabled in the event that a reply pulse was missing during a previous dwell while the AND gate 66 is enabled, if the reply pulse was present during that dwell. The flip-flop 69 is therefore called a hit/miss control generator flip-flop.

The filler pulse is delayed by the delay circuit 68 when a reply pulse was present during the previous dwell. The range gate generator 44 is therefore not reset for a short time after the expected time of arrival of the reply pulse. Accordingly, a reply pulse, which may move or jitter slightly from one dwell to the next, will be received even though such jitter causes a delay of the reply pulse within the delay provided by the circuit 68.

If the reply pulse was missing during the preceding dwell, the filler pulse is produced by the AND gate 65 at the expected time of arrival of the reply pulse, since the gate 65, rather than the gate 66, is enabled by the hit/miss control generator 68.

The reply pulse or the filler pulse operates the counter control generator flip-flop 38 in the input control unit 12 and stops the calculation unit 10 at the end of each dwell. Also, either the reply pulse or the filler pulse will enable the transfer gates 24 to transfer the count stored in the up counter 22 into the down counter 26 at the end of the dwell. Calculation unit operation is therefore continued, in spite of missing reply pulses.

The acquisition control unit 16 receives as inputs the interrogation pulse, the range gated reply pulse, and the filler pulse. Of course, either the range gated reply pulse or the filler pulse will occur during any one dwell. The interrogation pulse is operative to set a flip-flop 70. The flip-flop 70, when set, enables an AND gate 72. This AND gate 72 also receives the filler pulse as an input. The range gated reply pulse from the AND gate 58 is applied to reset the flip-flop 70. Since the flip-flop 70 is reset only when the reply pulse is received and remains reset until the transmission of an interrogation pulse at the start of the next dwell, the flip-flop 70 may be called a reply memory flip-flop.

If the flip-flop 70 is set, the AND gate 72 is enabled to pass the filter pulse. The filler pulse will not be transmitted by the AND gate in the event that a reply pulse is received during the same dwell as the filler pulse. The range gated reply pulse is applied to an "up" input and the filler pulse, when available at the output of the AND gate 72, is applied to a "down" input, of an up-down counter 74. This counter 74 will be described more fully hereinafter in connection with FIG. 5 of the drawings.

The counter 74 is incremented by reply pulses and decremented by filler pulses. It may be desirable to use only every other filler pulse to decrement the counter 74 in situations where the reply pulse efficiency is relatively low, so as to prevent the acquisition control unit from switching the computer from track to search, when a large number of missing reply pulses is to be expected. An AND gate 76 is connected to the stages of the counter 74, which provide output levels when a predetermined number of pulses are counted in the counter, such predetermined number being an indication that a replying transponder station has been acquired. A suitable number of counts has been found to be six.

Another AND gate 78 is connected to the stages of the counter which provide output levels when the counter is decremented to zero. An output level is therefore provided by the AND gate 78 when a zero count is stored in the counter 74. A flip-flop 80 is set by the output of the AND gate 76 and reset by the output of the AND gate 78. The flip-flop 80 produces an 1 output level when set which is used to condition the computer for tracking. This output level is applied to an AND gate 82 and enables that gate when the computer is in its tracking mode of operation. Delayed filler pulses are passed by the AND gate 82 and enable the transfer gates 28 to read the up counter 22 out into the storage register 30. Accordingly, the register and the display provided by the indicators 32 are updated each dwell and only during the tracking mode of operation of the computer.

The acquisition control unit 16 also performs the function of prolonging the duration of the range gate during the search mode of operation. The zero count output level from the AND gate 78 is applied through an inverter 84 to an input of an AND gate 86. This AND gate 86 controls the passage of filler pulses to the OR gate 60, which filler pulses are passed through the AND gate 62 in the search mode of operation and stop the range gate.

When a zero count is indicated by the output of the AND gate 78, the AND gate 86 is inhibited and filler pulses are not permitted to stop the range gate. Accordingly, the range gate duration is extended until a squitter or reply pulse is encountered which then stops the counter control generator flip-flop 38 and terminates a sequence of calculation unit operation.

Should the reply signal disappear or move outside of the range gate, the acquisition counter receives a sufficient number of filler pulses to cause the counter 74 to count down to zero, at which time the AND gate 78 produces an output, resets the flip-flop 80 and rein-states the search mode of operation. The information in the storage register 30 and hence displayed by the indicators, is not erased until the storage register is reset by a requisite number of 300 mile output pulse from the counter 22, which resets the storage register 30 by means of the lost signal counter 34.

Figure 3:
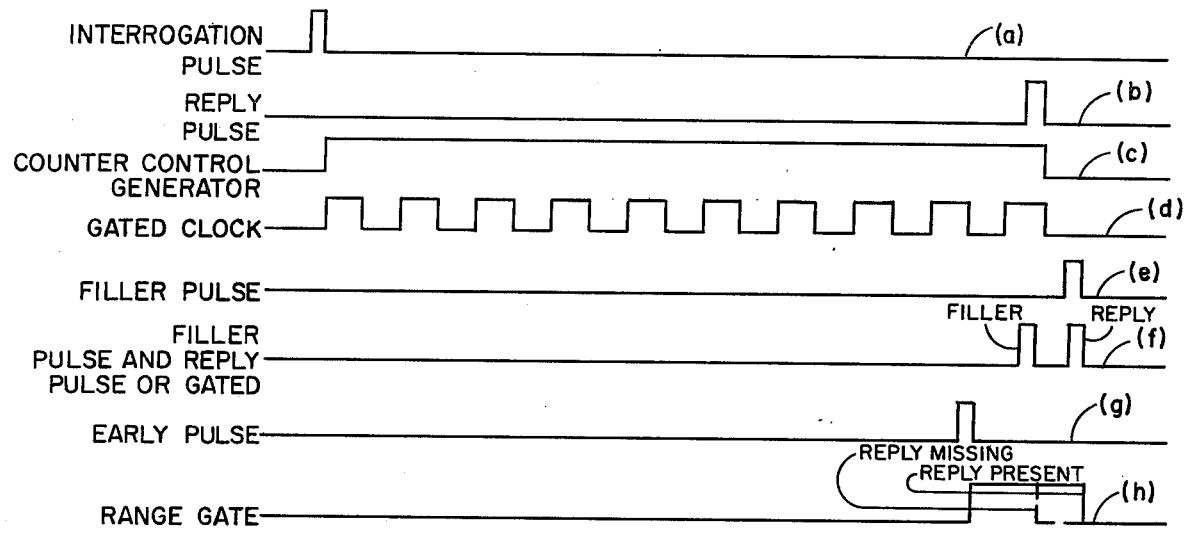
FIG. 3 is a diagrammatic showing of waveforms which occur at different points in the system of FIG. 2 during the operation thereof.

The operation of the range computer system may be more clearly understood by referring to the waveforms of FIG. 3. These waveforms, idealized in drawing for the purpose of clarity, are typical of those which occur during the successive dwells. The interrogation pulse (a) sets the counter control generator flip-flop 38 upon occurrence of the lagging edge thereof. The counter control generator flip-flop 38 remains set until occurrence of the reply pulse, the lagging edge of which is operative to reset the counter control generator flip-flop 38. Thus, the counter control generator flip-flop 38 provides an output (c) which has a duration from the lagging edge of the interrogation pulse to the lagging edge of the interrogation reply pulse. The clock pulses are gated through the AND gate 40 for the duration of the counter control generator flip-flop 38 output. The gated clock pulses are shown in waveform (d) and are applied to the input of the up counter 22.

The number of pulses counted during the dwell is a measure of the range between the interrogator and the responder stations. The delayed filler pulse, during the tracking mode of operation, is passed by the AND gate 82 and reads out the up counter into the storage register 30. The count is then displayed on the indicators.

On the next dwell, it is assumed, for example, that the reply pulse is missing. An early pulse shown in waveform (g) is generated prior to the expected time of arrival of the reply pulse and is applied through the OR gate 48 to set the range gate generator flip-flop 44. Since the reply pulse is missing, a filler pulse (e) is produced at the expected time of arrival of the reply pulse plus a delay due to the delay circuit 68. This delay is produced because the hit output of the flip-flop 68 is present. The hit/miss control generator flip-flop 68 has a memory for the presence or absence of the reply pulse received during the previous dwell. This delayed filler pulse stops the range gate. The range gates produced at the 1 output of the flip-flop is shown in waveform (h) as the solid line pulse. The filler pulse reads out the up counter 22 into the down counter 26 after a delay provided by the circuit 42. The filler pulse also stops the input of clock pulses to the up counter by actuating the counter control generator flip-flop 38 just prior to read out of the up counter into the down counter.

Waveform (f) illustrates the special case wherein a reply pulse occurs within delay period of the delay circuit 68. In the event that the reply pulse was received during the previous dwell, the hit/miss control generator flip-flop 69 is set. Accordingly, the miss output inhibits the AND gate 65 and prevents the filler pulse from being generated. Since the reply pulse is received before the delayed filler pulse, the range gate flip-flop 44 remains set so that the reply pulse is range gated and is operative to stop the transmission of clock pulses to the calculation unit and to read out the up counter into the down counter and also into the storage register during the tracking mode of operation of the flip-flop.

Figure 4:
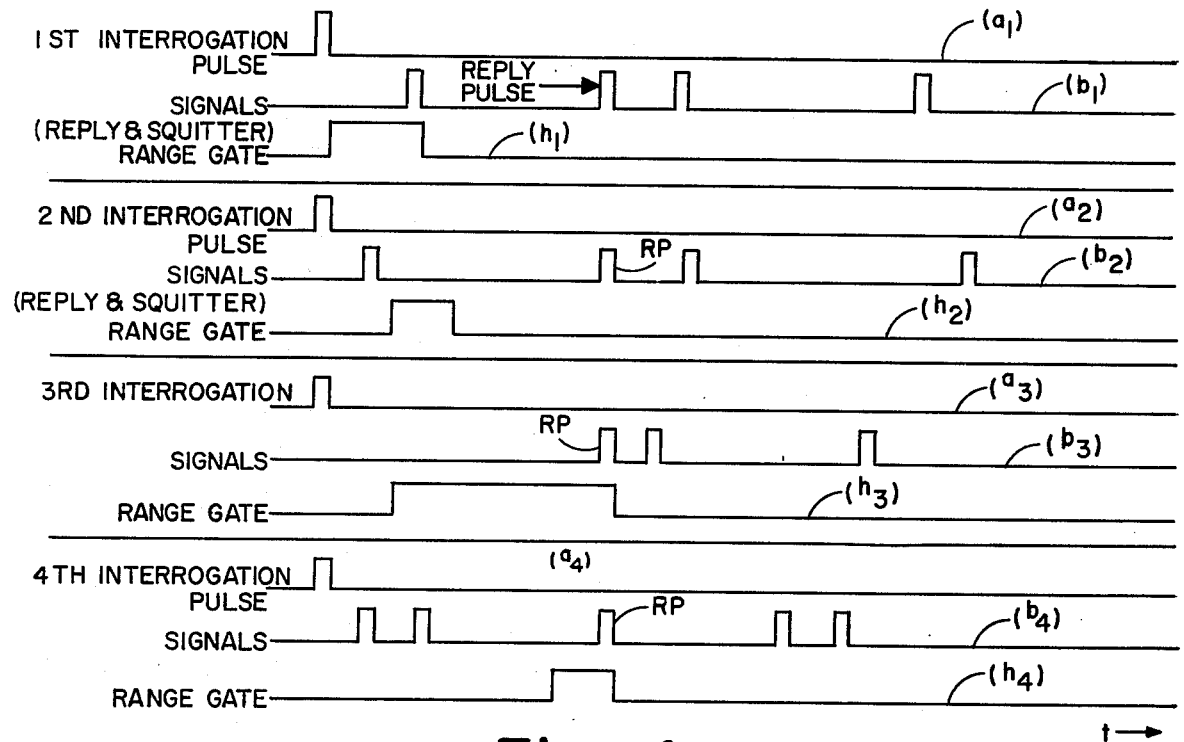
FIG. 4 is a series of waveform diagrams similar to those shown in FIG. 3 which illustrates the waveforms during the four successive dwells during the search phase of operation of the system.

The operation of the range computer during the search mode of operation will be more clearly understood by reference to FIG. 4, which shows four groups of waveforms which are produced during four successive dwells during the search mode of operation. The first interrogation pulse which occurs after the range computer operation is initiated is shown in waveform ($a_1$). The signals which are received at the signal input terminal after transmission of the first interrogation pulse are shown in waveform ($b_1$). The first of these signals to occur is assumed, for purposes of this explanation, to be a squitter pulse. The second pulse is the reply pulse (RP). The first interrogation pulse starts the input control unit and begins the count in the up counter. The first interrogation pulse also actuates the range gate control unit 14, so that the first squitter pulse is range gated and resets the counter control generator flip-flop 38 and thereby causes the up counter 22 to stop counting.

The range gated squitter pulse also resets the range gate generator flip-flop 44 and terminates the range gate. The range gate generated during the first dwell is shown in waveform ($h_1$) as a pulse which is initiated at the lagging edge of the first interrogation pulse and is terminated at the lagging edge of the first squitter pulse. Since the range gate ends at the first squitter pulse lagging edge, the reply pulse which is received during the first dwell is not utilized. The first squitter pulse also operates the transfer gates 24, so that the count registered in the up counter during the range gate interval of the first dwell is stored in the down counter 26 at the beginning of the second dwell.

The first interrogation pulse also sets the flip-flop 70 in the acquisition control unit 16. The first squitter pulse is range gated and resets that flip-flop 70, so that the acquisition control unit is inhibited from receiving filler pulses. The range gated squitter pulse, however, is applied to the up input of the counter 74 and causes a count of one to be registered in that counter 74.

The second dwell is started by the second interrogation pulse as shown in waveform ($a_2$). The second interrogation pulse actuates the input control unit 12, so that the up counter 22 begins to count in an upward direction and the down counter begins to count in a downward direction. The down counter 26 generates an early pulse which is transmitted by way of the AND gate 52 and the OR gate 48 to the range gate generator flip-flop 44. This flip-flop 44 is set and the range gate is started by the early pulse. This range gate is illustrated in waveform ($h_2$). The first signal, which is a squitter pulse, and which is shown in waveform ($b_2$), occurs before the start of the range gate and is therefore prevented by the range gate control unit 14 from actuating in the input control unit 12.

The next pulse, which is received as a signal, is the reply pulse (RP). The down counter 26, however, produces a zero pulse prior to the receipt of this reply pulse. This zero pulse is delayed in the circuit 68 and stops the range gate. Since the reply pulse occurs later than the end of the range gate, it is excluded from the range computer by the AND gate 58.

The delayed squitter pulse also passes through the AND gate 72 in the acquisition control unit 16. This AND gate 72 is enabled by the flip-flop 70, which is set by the second interrogation pulse. The acquisition counter 74 then is decremented by the delayed filler pulse back to a zero count. This zero count is represented by a level at the output of the AND gate 78, which inhibits the transmission of filler pulses, which may be received during the third dwell, from terminating the range gate.

The third dwell is initiated by the third interrogation pulse, as shown in waveform ($a_3$). The input control unit 12 is actuated and the counters 22 and 26 begin to count up and down respectively. The early pulse produced by the down counter sets the range gate generator flip-flop 44 and starts the range gate as shown in wave-form ($h_3$). The down counter produces a zero pulse prior to the time that the reply pulse (RP) is received. This zero pulse is used as a filler pulse which is again applied to the counter 74 in the acquisition unit 16. It will be recalled that the acquisition unit was decremented to zero during the second dwell. Accordingly, the acquisition unit 16 continues to supply a zero count output level in response to the filler pulse, which is produced during the third dwell. This zero count level inhibits the AND gate 36 and prevents the filler pulse from entering the range gate control unit 14. Accordingly, the range gate generator flip-flop 44 is not reset by the filler pulse. The reply pulse, (waveform ($b_3$)) which arrives later than the filler pulse therefore is range gated and is applied to the input control unit and resets the counter control generator flip-flop 38. The up counter 26 and the down counter 24 are then stopped. The range gated reply pulse also terminates the range gate by resetting the range gate generator flip-flop 44. The reply pulse is also applied to the acquisition counter 74 and causes that counter to register a one count. The zero count output level is therefore terminated.

The fourth interrogation pulse waveform ($a_4$) starts the fourth dwell. The down counter 26 produces an early pulse just before the time interval as measured between the third interrogation pulse and the third reply pulse. The range gate (waveform h₄) is started by the early pulse. The squitter or other extraneous signals which occur before the start of the range gate are excluded. The reply pulse does occur before the missing pulse control unit 18 produces a filler pulse and causes the range gate to be terminated. The reply pulse also actuates the input control unit 12 which stops the count and transfers the count from the up counter 22 to the down counter 26, as explained above. The range gated reply pulse (waveform (b₄) — pulse RP) is applied to the up terminal of the counter 74 in the acquisition control unit 16. The acquisition control unit then registers a count of two.

When the acquisition counter registers a count of six, the AND gate 76 provides an output pulse which sets the search/track generator flip-flop 80. The 1 output from that flip-flop 80 enables the AND gate 82 so that the calculation unit 10 may be read out, and inhibits the AND gate 62, so that during tracking the delayed zero pulse from the down counter 36 is operative to reset the range gate generator flip-flop 44. The range gate therefore will have a duration during tracking the tracking mode which lasts from the occurrence of early pulse to the time the delayed zero pulse is generated.

Figure 5:
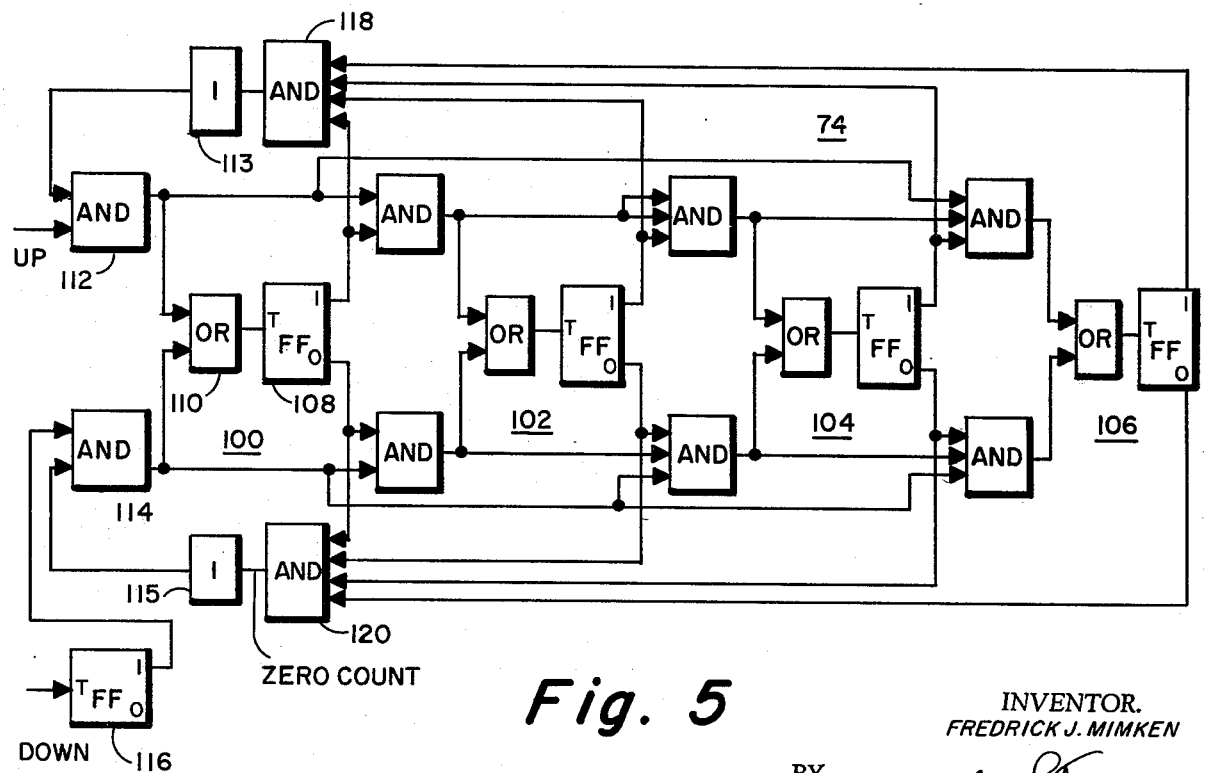
FIG. 5 is a block diagram of the acquisition counter shown in FIG. 2.

The counter 74 in the acquisition control unit 16 is shown in FIG. 5 as a four-stage counter. It will be appreciated, however, that additional stages may be included. For example, it may be desirable to provide one or more additional counter stages so that the counter may count up to or down from a larger number than is the case for the illustrated counter. For example, it may be desirable to add an additional stage to the counter so that the counter may reach a count of 15. In order to decrement the counter to zero count, at least fifteen filler pulses would be required. Accordingly, a larger number of missing pulses would be needed in order to switch the range computer from its tracking mode to its search mode of operation.

The illustrated counter has four stages 100, 102, 104 and 106, which are connected in a tandem. Each stage includes a flip-flop 108, having a trigger or toggle input which causes the flip-flop to change states upon receipt of a pulse. An OR gate 110 is output connected to the trigger input of the flip-flop 108. Inputs to the OR gate 110 are supplied by a pair of AND gates 112 and 114. The AND gates 112 and 114 of the first stage 100 receive, as inputs, the range-gated reply signals and the filler pulses. The range-gated reply signals are connected to the up terminal of the counter in order to cause the count to be incremented, while the filler pulses cause the count to be decremented and are applied to the down terminal of the counter. The down terminal may be connected to a trigger input of a flip-flop 116, the 1 output of which is input connected to the AND gate 114. This flip-flop 116 will provide one output pulse for each pair of input pulses. Accordingly two filler pulses will be required to register a single count in the downward direction, whereas only a single reply pulse will be required to increment the count. It is desirable to use the flip-flop 116 to divide the number of filler pulses which are applied to the down counter in half in applications where the reply pulse efficiency is low and a large number of missing pulses may be expected. The counter 74 may be considered topologically as having an "up-side" and a "down-side". The up-side is associated with the 1 outputs of the flip-flops on the AND gate 112. The down-side is associated with the 0 outputs of the flip-flops and the gate 114.

The up-side of the counter 74 includes an AND gate 118 which receives inputs from the 1 outputs of the flip-flops in each of the stages 100, 102, 104 and 106 and is connected to the input of the AND gate 112 by way of an inverter 113. The AND gate 114 on the down input terminal side of the counter receives an output from an AND gate 120 on the down side of the counter by way of an inverter 115. This gate 120 is input connected to the 0 outputs of the flip-flops of each of the stages 100, 102, 104 and 106. The AND gates in the stages 102, 104 and 106, which are on the upside of the counter, are connected in tandem, each AND gate being output connected to an input of the AND gate in a succeeding stage. In addition, the AND gates in the latter stages 104 and 106 are all input connected to the output of the similarly connected AND gate 112 in the first stage. Similar connections are provided between the inputs and outputs of the AND gates on the down side of the counter 74.

By virtue of the interconnection of the up side and down side AND gates, a reply pulse which is applied to the up terminal at the input of the gate 112 will cause the first stage flip-flop 108 to change state and will also cause changes in state in those other flip-flops which must change stage in order to increment the count. If all of the flip-flops are in their 1 state, which is indicative of the highest count which may be stored in the counter (viz. 8, in the illustrated counter), the AND gate 112 in the first stage 100 will be inhibited. The counter therefore will not reach a count higher than 8, nor will additional up pulses cause the counter to recycle, since the down side AND gates are similarly connected to the up side AND gates. A down pulse which is applied to the first stage AND gates. A down pulse which is applied to the first stage AND gate 114 will change the stat3 of the first state flip-flop 108 and be propagated by the AND gates of the successive stages in order to change the states of the respective flip-flops so as to decrement the count stored in the counter. The AND gate 120 is operative to inhibit and the AND gate 114 when a zero count is stored in the counter. Pulses which are applied to the down terminal after the counter is decremented to zero do not further affect the count. The output of the AND gate 120 may be used to supply the zero count output of the counter. This zero count output is used to extend the range gate, as explained above in connection with FIG. 2.

The operation of the acquisition counter 74 may be more clearly understood by consideration of a specific case wherein a predetermined count, say 4, is stored in the counter. In such a case, all of the flip-flops except the flip-flop in the third stage 104 are in their zero states. A reply pulse, which is applied to the up terminal will propagate through the AND gate 112 of the first stage and cause the flip-flop 108 in that stage to change state. the flip-flop in the second stage 102 does not change state because the flip-flop in the first stage 100 inhibits the second stage AND gate while the reply pulse is being propagated. Similarly the AND gate in the third stage 104 blocks the propagation of the reply pulse to that stage. The reply pulse also does not propagate to the fourth stage 106 because the AND gate of that stage is inhibited by the output of the AND gate in the third stage 104. Only the first stage AND gate will change states, thereby the count registered in the counter is incremented to 5.

Again assuming that the counter has a count of 4 stored therein, when a filler pulse causes the flip-flop 116 to change from its zero to its 1 state, a pulse is propagated through the AND gate 114 which causes the first stage flip-flop 108 to change states. The second and third stage AND gates are enabled by the zero outputs of the flip flops in the first and second stages 100 and 102 respectively. Accordingly, the down pulse causes the second and third stage flip-flops to change their state. Since the third stage flip-flop was in its 0 state, the fourth stage AND gate is inhibited. Accordingly, the fourth stage flip-flop does not change state. The first stage flip-flop is left in its 1 state, the second stage flip-flop is left in its 1 state, and the third stage flip-flop is returned to its 0 state. The fourth stage flip-flop remains in its 0 state. Accordingly, a count of 3 is registered in the counter. The counter 74 has the advantage of a rapid counting cycle since the pulses are propagated simultaneously to all the stages. Another advantage of the counter is that a minimum number of logic elements are required, namely a pair of AND gates, an OR gate and a single flip-flop per counter stage.

Figure 6:
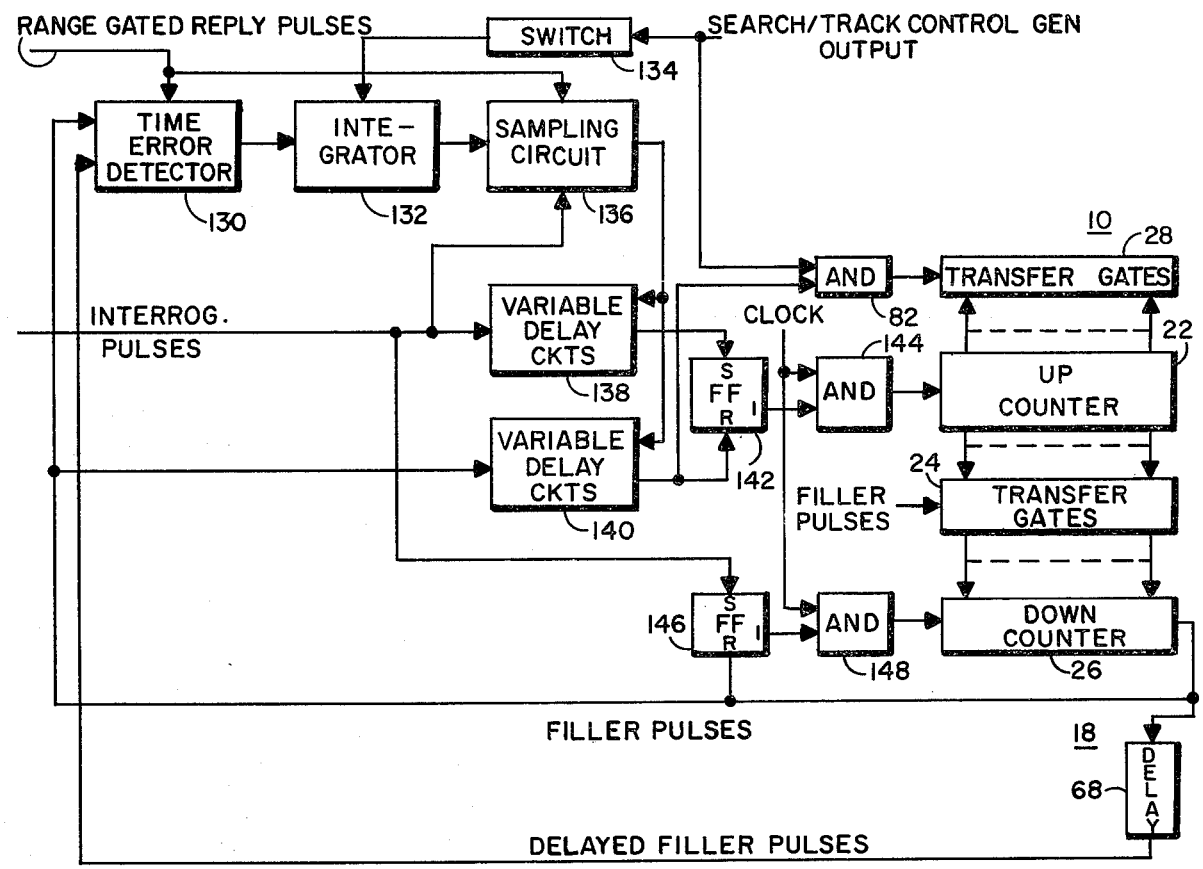
FIG. 6 is a simplified block diagram of a range computer system embodying the invention showing the components thereof which provide velocity averaged error signals.

FIG. 6 illustrates another embodiment of the range computer. The range computer shown in FIG. 6 is similar to that shown in FIG. 2 except insofar as the input control unit is concerned. Accordingly, only portions of the calculation unit 10 and the missing pulse control unit 18 are shown in FIG. 6 in order to clarify the illustration and the ensuing diescription. The input control unit shown in FIG. 6 may also utilize elements of the input control unit 12, which were illustrated in FIG. 2. For example, the counter control flip-flop 38 and the AND gate 40 may be utilized. It may be desirable to provide suitable circuit components and switching for operating the range computer with its elements interconnected as shown in FIG. 2 during the search mode of operation and use its circuit elements connected with its additional components during the tracking mode of operation.

As will become more apparent as the description of the range computer shown in FIG. 6 procedes, advantages thereof, such as accommodation of reply pulse jitter and effective operation in spite of a large number of missing reply pulses as may occur while tracking during identity tone transmission may be more fully appreciated. The input signals to the system shown in FIG. 6 are the range gated reply pulses which may be obtained at the output of the AND gate 58 (FIG. 2) and the lagging edge of the interrogation pulses as may be obtained from the pulse shaping circuit 36. A circuit such as the pulse shaping circuit may be used to provide the lagging edges of the range gated reply pulses as input pulses to the system of FIG. 6. Accordingly, where range gate reply pulses or interrogation pulses are mentioned hereinafter in connection with a description of FIG. 6, it will be understood that pulses occurring at the lagging edges of such reply pulses and interrogation pulses are being utilized. Also utilized in the system of FIG. 6 are the filler pulses and the delayed filler pulses which are available at the zero pulse output of the down counter 20 and at the output of the delay circuit 68 respectively; the latter being included in the missing pulse control unit 18. The lagging edges of the filler pulses may also be used in the same manner as the lagging edges of the reply and interrogation pulses in order to provide a timing in the system of FIG. 6. The search/track generator flip-flop 80 output level is also used.

The filler pulses and the reply pulses are applied to a time error detector 130. The time error detector derives an output voltage which has a polarity and a magnitude which depends upon the sense and magnitude of the difference between the time of occurrence of the filler pulses and the reply pulses during each dwell. Inasmuch as this time difference may be very minute, viz. a matter of nanoseconds, the time error detector includes circuitry for providing either a train of pulses of one polarity or a train of pulses of opposite polarity during each dwell. The average voltage magnitude of this train of pulses corresponds to the time difference. This average value is obtained by means of an integrator circuit 132 which may be a resistance-capacitance integrator having a time constant sufficient to follow relatively slow variations in the voltage produced by the error detector 130 during the tracking mode of operation of the computer and therefore averages the error voltage over a large number of dwells, 50 being suitable during the tracking mode. In the event that the computer includes the input control unit shown in FIG. 6 for both search and tracking modes of operation, it is desirable to include a system 134 for reducing the time constant of the integrator 132 by several orders of magnitude, so that the error voltage may vary rapidly from dwell to dwell, in order to achieve rapid acquistion. This may be accomplished by switching a resistor of proper value across a time constant determining resistor in the integrator 132. Such switching may be accomplished by transistors or like active devices which are actuated by the search/track control generator flip-flop 80 output. The time error detector 130 will be described more fully hereinafter in connection with FIG. 7. The delayed filler pulses are applied to the time error detector so as to reset the detector at the end of each dwell.

An error voltage is obtained from the integrator 132 by means of a sampling circuit 136 which is operated upon occurrence of the interrogation pulses and the range gate pulses. This sampling circuit produces pulses somewhat wider than the interrogation and reply pulses, and coincident therewith. Of course, the output pulses from the sampling circuit have an amplitude and polarity depending upon the error voltage at the integrator 132 at the time of sampling.

The output pulses from the sampling circuit are applied to variable delay circuits 138 and 140. The interrogation pulses are applied to one of these variable delay circuits 138 while the filler pulses are applied to the other of the variable delay circuits 140. These delay circuits may be designed in accordance with techniques known in the art. A suitable delay circuit may include a ramp generator which initiates a ramp voltage when a pulse is applied thereto. The interrogation pulses may initiate the ramp in the case of the delay circuits 138, while the filler pulses may initiate the ramp in the cases of the delay circuits 140. The sampled error voltage and the ramp may be compared with each other, say in a difference amplifier. When the output voltage of the difference amplifier reaches a predetermined level, the amplifier triggers a circuit which provides a pulse. The time of occurrence of the pulse with respect to the initiation of the ramp depends upon the amplitude of the error voltage provided by the output of the sampling circuit. In the absence of an error voltage the variable delay system presents substantially no delay and produces an output pulse substantially coincident with the interrogation pulse in the case of the delay circuits 138 and with the filler pulse in the case of the circuits 140. The error voltage will delay the interrogation pulse of the filler pulse, depending upon the polarity of the sampled error voltage and for an interval, depending upon the magnitude of the sampled error voltage. The sampled error voltage, for example, may be positive in polarity when the range gated reply pulse is early (viz. the range gated reply pulse occurs ahead of the filler pulse). The sampled error voltage may be negative in the event that the reply pulse is late. A positive sampled error voltage will produce an output pulse from the variable delay circuits 138, which is delayed in respect to the interrogation pulses. A negative output voltage indicative of a late reply pulse will operate the circuits 140 to delay the filler pulse. On the other hand, a negative sampled error voltage will not cause any delay of the interrogation pulses due to the delay circuits 138. Similarly, a positive error voltage will not produce any delay in the filler pulses due to the action of the circuits 140.

The output pulses from the variable delay circuits 138 and 140 are respectively applied to set and reset terminals of a flip-flop 142 which functions as the up counter 22 control generator. When the flip-flop 142 is set, it enables AND gate 144, which is similar to the AND gate 40 (FIG. 2) and permits that gate to transmit clock pulses which are counted in the up counter. Since, as explained above, a time error due to an early reply pulse delays the interrogation pulse, the counter control generator flip-flop 142 will delay the start of calculations by the up counter 22. The up counter 22 will be stopped by the filler pulse which is not delayed when the error detector 130, the integrator 132, and sampling circuit 136 produce an output voltage indicative of an early reply pulse. Accordingly, the count reached by the up counter is reduced to correspond to the early arrival of the reply pulse. Conversely, the late arrival of a reply pulse will not delay the start of the up counter but will delay the time when the up counter is stopped. The count is therefore increased to represent the late arrival of a reply pulse. The foregoing condition corresponds to the condition where an aircraft is moving away from a transponder so that reply signals which are being tracked arrive at later and later intervals.

The time interval between the interrogation pulse and the filler pulse represents the range measurement at one dwell, while the time interval between the range gated reply pulse and the interrogation pulse represents the range of the succeeding dwell. The difference between these time intervals is a measure of the change of range or the velocity of the interrogator-equipped aircraft. The time error detector provides an output which is proportional to this velocity. The velocity is averaged over a number of dwells by the integrator 132. This average velocity error is used in the variable delay circuits 138 and 140 to supply information to the calculation unit so as to correct the count. In the event that there is no change in velocity, the count calculated in the calculation unit depends upon the time between the time of occurrence of the interrogation pulse and the range gate reply or filler pulse during each dwell. In this connection it will be noted that the range gated reply or filler pulses enable the transfer gates and transfer the count from the up-counter to the down-counter at the end of each dwell as was described in connection with FIG. 2. The time corrected filler pulses also are applied to the transfer gates 28 to read-out the computation. The velocity averaging feature permits the computer to track reply singals even in the absence of a large number of reply signals, say during an identity tone, because the integrator 132 provides an output voltage which persists over the large number of dwells during which such reply pulses may be missing. Read-out during such dwells is accomplished by the filler pulses which are obtained from the delay circuits 140.

The down counter is enabled by a flip-flop down counter control generator 146 which enables an AND gate 148 which supplies the clock pulses to the down counter. The flip-flop 146 is set and reset respectively by the interrogation and filler pulses. Accordingly, the down counter produces a zero pulse which is translated into a filler pulse on each dwell, notwithstanding that a range gated reply is produced.

The count registered in the up counter 22 during a dwell represents the calculated range which is corrected in accordance with the average value of the change in range (i.e. velocity) over a number of dwells. In other words, the velocity of the integrator equipped craft is tracked as well as the reply signals which are translated into range measurements by the computer. The count in the up counter is transferred to the down counter 26, upon occurrence of a filler pulse, by the transfer gates 24. The filler pulse is produced on the next dwell at a time corresponding to the count registered in the down counter in the preceding dwell. Since this count is velocity averaged, the filler pulse is generated at a time in the dwell at which the reply pulse would occur on the average. The time of occurrence of the filler pulse is corrected on each dwell in accordance with the average time error between it and the reply pulse. The actual time of occurrence of the filler pulse varies as the range of the interrogator equipped craft closes or opens with respect to the transponder.

Figure 7:
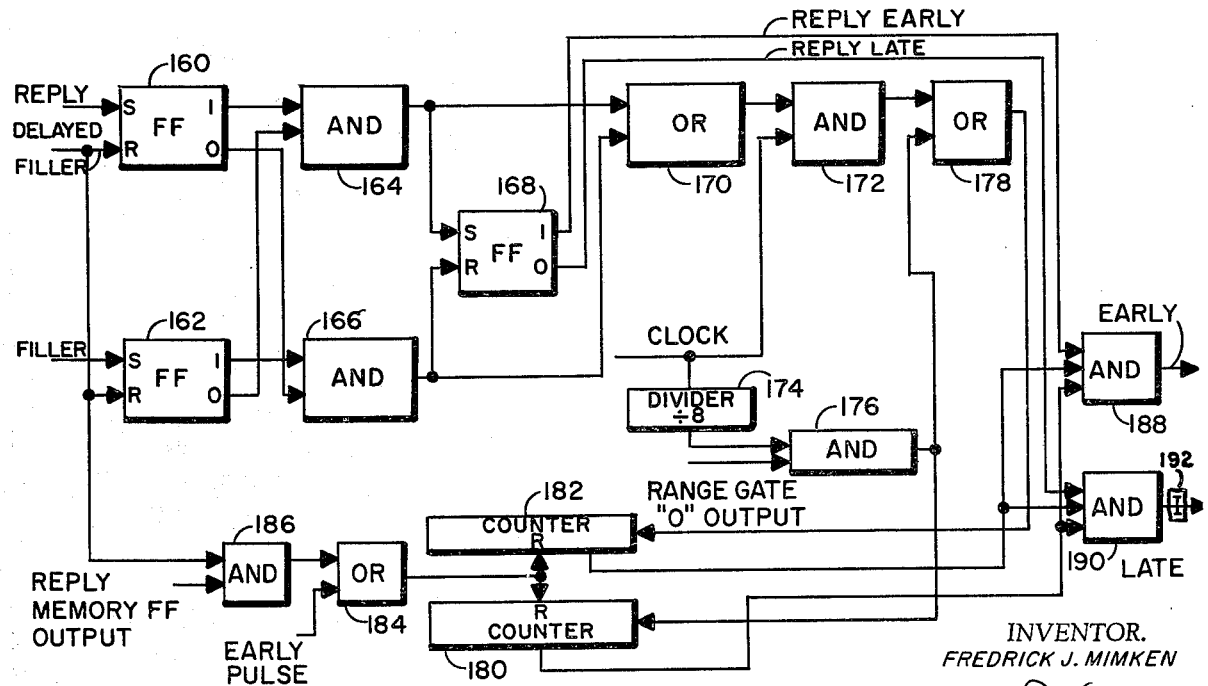
FIG. 7 is a block diagram of the error system shown in FIG. 6.

The time error detector 130 is shown in FIG. 7. Inputs to the time error detector are the reply and filler pulses. The delayed filler pulse is also applied as an input when generated. The time between the reply and the filler pulse is generally very, very short. For example, when the velocity of the craft is not substantial, the reply and filler pulses are substantially coincident. During tracking, the time between the reply and filler pulses is under 1 microsecond. This time period is several orders of magnitude lower than the period of a dwell. The error detector system shown in FIG. 7 has the feature of obtaining an error voltage responsive to the time error between the reply and filler pulses, which error voltage is produced during the entire dwell, notwithstanding that the time period when the time error is produced is many orders of magnitude smaller than the dwell period.

The time difference is digitized by logic elements which derive the sense of the difference. These logic elements include a first flip-flop 160 which is set by the reply pulse and reset by the delayed filler pulse. A second flip-flop 162 is set by the filler pulse and also reset by the delayed filler pulse. When the reply pulse is early (viz. occurs before the filler pulse), an AND gate 164 is enabled by the first flip-flop 160. The second flip-flop 162 enables the AND gate 164 until the filler pulse arrives. The time between the time of occurrence of the reply pulse and the time of occurrence of the filler pulse is represented by the width of the output pulse from the AND gate 164.

A second AND gate 166 simultaneously provides an output pulse having a width corresponding to the time difference between the time of occurrence of the filler pulse and the time of occurrence of reply pulse when the reply pluse is late. (viz, occurs after the filler pulse). Either the AND gate 164 or the other AND gate 166 will provide a pulse during each dwell wherein a reply and filler pulse are produced. The delayed filler pulse resets the flip-flops 160 and 162 before the start of the next dwell.

A memory flip-flop 168, which is set by the output of the early reply AND gate 164 and is reset by the output pulse from the late reply AND gate 166 provides memory of the condition (either late reply or early reply) which was last sensed by the AND gates 164 and 166, thus an early reply or a late reply condition which was detected on a dwell will be remembered during the next succeeding dwell.

The magnitude of the time interval between the occurrence of the reply and filler pulses is derived by means of logic circuit, including an OR gate 170, which transmits the output pulses from the early reply AND gate 164 or of the late reply AND gate 166 to another AND gate 172. These pulses enable the AND gate 172 for the duration of the pulses produced by the gates, to pass the clock pulses which may be derived from the same source as the clock pulses shown in the preceding FIGS. These clock pulses may have, as previously set forth, a frequency of 8.092 megacycles per second.

The clock pulses are divided by a divider circuit 174, which may be a flip-flop divider which divides by eight to produce pulses having a frequency of approximately 1 megacycle per second. The latter pulses are transmitted through another AND gate 176 when that AND gate is enabled by the range gate generator flip-flop (44, FIG. 2); the zero output of the range gate flip-flop being suitable for the purpo9se. The outputs of the AND gates 172 and 176 are gated through an OR gate 178. The OR gate provides either of two output frequencies which may occur during two successive intervals, namely (a) an 8 megacycle (approximately) pulse train during the interval between the reply and filler pulses and (b) a 1 megacycle (approximately) pulse train during the interval outside of the range gate when the reply and filler pulses are produced. The 8 megacycle pulse train occurs during a period of time much shorter than the period of time of occurrence of one megacycle pulse train which follows the 8 megacycle pulse train.

The 1 megacycle pulse train is applied to a first counter 180 and through the OR gate 178 to a second counter 182 which is similar to the first counter 180. The 8 megacycle pulse train is also applied to the second counter 182 via the AND gate 172 and OR gate 178. Both counters may suitably be binary counters which count to 32.

The counters are reset by the early pulse which is applied to reset lines thereof through an OR gate 184. The counters may alternatively be reset by the delayed filler pulse which is applied to the OR gate 184 via an AND gate 186. This AND gate 186 is enabled only if a reply pulse was missing during the previous dwell. The early pulse resets the counters 180 and 182 at the beginning of the range gate in each dwell. The delayed filler pulse is operative to end the range gate during the tracking mode of operation as also explained above in connection with FIG. 2. Accordingly, when the reply pulse is missing during the previous dwell, the counters are reset after the range gate and the counts registered therein do not reflect the counts which are registered during the range gate reflect the magnitude of the time error between the time of occurrence between reply and filler pulses, the time error magnitude will not be manifested except during the reception of reply pulses, and merely an output indicating the sense of the error will be produced.

The output signals are produced by two AND gates 188 and 190 which respectively provide an output when the reply is early and when the reply is late. An inverter 192 is connected to the output of the latter AND gate 192 so that the early and late outputs will respectively be of opposite polarity. These outputs may then be applied to the integrator 132, FIG. 6, which produces an error voltage having a polarity and magnitude indicative of the sense and magnitude of the average time error. Inputs to the AND gates 188 and 190 are provided by the memory flip-flop 168 and the counter outputs.

In operation, the counters 180 and 182 are reset by the early pulse. The OR gate passes a burst of eight megacycle clock pulses during the interval between the time of occurrence of the reply and filler pulses. The number of pulses in this burst, and therefore the count registered in the counter 182 during the range gate, corresponds to the time error between time of occurrence between reply and filler pulses. The counter 182 therefore has a count registered there at the end of the range gate interval which corresponds to the time error. At the end of the range gate interval this count is incremented by the one megacycle clock pulses. The counter 180, on the other hand, receives only the one megacycle clock pulses during interval outside of the range gate. The counters therefore provide a number of pulses to the AND gates 188 and 190 throughout the dwell, which is a function of the time error between the reply and filler pulse occurrences. Only one of these AND gates 188 and 190 is enabled. When the reply pulse was early, the AND gate 188 is enabled and produces a pulse train of one polarity, say positive, whereas when the reply is late, the AND gate 190 is enabled and produces a pulse train of opposite polarity, say negative. The number of pulses in these trains depends on the magnitude of the time error. Accordingly when the average value of these pulse trains is obtained over a number of dwells, for example 50 dwells being suitable, the output voltage of the integrator is a DC level, having a magnitude which depends upon the time error.

From the foregoing description it will be apparent that there has been provided an improved computer system which is especially adapted for use in TACAN and like navigation systems. While the invention has been described in terms of digital logic components, such as AND gates and OR gates, it will be appreciated that other forms of digital logic will be used to implement the invention. Other modifications in the described range computer will, of course, be obvious to those skilled in the art. Accordingly, the foregoing description should be taken merely as illustrative and not in any limiting sense.

What is claimed is:

1. A computer system for calculating the range between two stations which are in radio communication with each other, said system comprising:
   a. calculation means for producing an output having a value corresponding to the elapsed time between the transmission of a signal from a first of said stations to a second of said stations and the reception of a signal transmitted from said second station to said first station in reply to said first station transmitted signal, b. control means for supplying information to said calculation means respecting time of the occurrence of said first station transmitted signal and the time of reception of said reply signal, and c. means operated by said calculation means when said calculation means output equals an expected value for operating said control means to supply information simulating the information respecting the reception of reply signals to said claculation means whereby to maintain the operation of said calculation means on a continuing basis notwithstanding that said reply signals are missing.

2. A computer system for calculating the range between two stations which are in radio communication with each other, a first of said stations transmitting successive signals to each of which the second of said stations transmits a reply signal, said system comprising a. calculation means at said first station for producing an output having a value corresponding to the elapsed time between the transmission of a signal from said first station and the reception of said reply signal, b. control means for supplying information to said claculation means respecting the times of the occurrence of each said successive first station transmitted signal and the reception of each said reply signal in response thereto, c. means operated by said calculation means when said calculation means output corresponds in value to the elapsed time between a preceding signal from said first station and the reception of a reply signal in response thereto for supplying information to said control means respecting the time of occurrence of said last-named output, and d. means included in said control means for supplying said last-named information to said claculation means in the event that a succeeding reply signal is not received.

3. A computer system for calculating the range between two stations which are in radio communication with each other, comprising a. means for calculating said range on the basis of the time interval between the time of occurrence of a signal transmitted from a first of said stations to a second of said stations and the time of reception of a signal transmitted from said second station to said first station, b. control means operative upon transmission of said signals from said first station and upon reception of said signals from said second station for initiating and terminating operation of said calculating means, c. means operated by said calculation means when said calculation is not terminated within an interval of time related to the time interval between the time of transmission of said signals from said first station and the expected time of reception of said signals from said second station for terminating the operation of said calculating means, and d. means operated by said calculating means for indicating the range calculations.

4. A computer for calculating the range between a first station and a second station which are in radio communication with each other and which cyclically transmit interrogation and reply signals, said computer comprising a. means for calculating the range between said first station and said second station on the basis of the time interval between the time of transmission of said interrogation signal and the time of reception of said reply signal during each said cycle, b. means responsive to said interrogation signal for operating said calculating means to initiate the range calculation, c. means responsive to said reply signal for operating said calculating means to terminate said calculation, d. means operated by said calculating means for terminating said calculation when said calculating means is operatively processing said range calculation a time interval after occurrence of said interrogation signal at least substantially equal to the time interval between the time of occurrence of said interrogation signal and the time of occurrence of said reply signal during a preceding one of said cycles, and e. means included in said calculating means and operated by said reply signal for indicating said range calculation.

5. A computer system for computing the range between a first station and a second station which are in radio communication with each other and which repeatedly transmit interrogation signals and reply signals during successive cycles of operation, said computer system comprising a. a calculation unit for calculating the range between said first station and said second station on the basis of the time interval between the time of occurrence of said interrogation signal and the time of reception of said reply signal and for storing such range calculation, b. an input control unit responsive to said interrogation signal for initiating the operation of said calculation unit upon occurrence of each of said interrogation signals, c. a range gate control unit responsive to the calculation stored in said calculation unit during a preexisting cycle of operation thereof for supplying information to said input control unit as to the time interval after transmission of a succeeding interrogation signal, during which said input control unit is enabled to terminate operation of said calculation unit in response to a succeeding reply signal, d. a missing reply signal control unit operated by said calculation unit for supplying additional information to said input control unit so as to terminate the operation of said calculation unit when said reply signal does not occur during said time interval within which said control unit is enabled, and e. an acquisition control unit operated by said missing reply signal control unit and by said range gate control unit for conditioning said calculation unit to read out the range calculation made during each said cycle, so long as the number of reply signals which are received during said time interval in successive ones of said cycles exceed by a predetermined number the number of reply signals which are missing within said interval.

6. A digital computer system for calculating the range between two stations which are in radio communication with each other and which cyclically transmit interrogation and reply signals, said system comprising a. calculation means for producing a digital output having a value corresponding to the elapsed time between the time of occurrence of an interrogation signal transmitted from a first of said stations to the second of said stations and the time of reception of a reply signal transmitted from said second station to said first station during each of said cycles and for storing said output during the next cycle, and b. control means responsive to said stored output, said reply signals and said interrogation signals for supplying information to said calculation means respecting the times of occurrence of said interrogation signals and the expected and actual times of occurrence of said reply signals, said control means including 1. logic means coupled to said stored digital output for providing a signal corresponding to a missing reply signal at said expected time of occurrence, and 2. means for supplying to said calculating means said information respecting the time of occurrence of said missing reply signal when said reply signal does not actually occur.

7. A system for computing the range between two stations which are in radio communication with each other, one of which stations repetitively transmits an interrogation signal and reviews a reply signal, said interrogation and reply signals being successively transmitted or received upon successive dwells while said stations are in radio communication, said system comprising a. a calculation unit for calculating said ranging on the basis of the time interval between transmission and reception of said interrogation and reply signals during each of said dwells, b. a first control unit operated by said calculation unit for producing a synthethic reply signal at the expected time of occurrence of a reply signal on each of said dwells, and c. an input control unit operated by said reply signal, said synthetic reply signal and said interrogation signal for controlling said calculation unit to vary said range calculation on the basis of the average of the difference between the time of occurrence of said synthetic reply signal and said reply signal over a predetermined number of dwells.

8. A system for computing the range between two stations which are in radio communication with each other, one of which stations repetitively transmits an interrogation signal and reviews a reply signal, said interrogation and reply signals being successively transmitted or received upon successive dwells while said stations are in radio communication, said system comprising a. a calculation unit for calculating said ranging on the basis of the time interval between transmission and reception of said interrogation and reply signals during each of said dwells, b. a first control unit operated by said calculation unit for producing a synthetic reply signal at the expected time of occurrence of a reply signal on each of said dwells, and c. an acquistion control unit responsive to said synthetic reply signals and to said reply signals for enabling readout of said calculation by said calculation unit when said reply signals exceed said synthetic reply signals by a predetermined number.

9. A system for computing the range between two stations which are in radio communication with each other, one of which stations repetitively transmits an interrogation pulse and reviews a reply pulse, said interrogation and reply pulses being successively transmitted or received upon successive dwells while said stations are in radio communication, said system comprising a. a calculation unit comprising
1. a source of clock pulses,
2. first and second counters responsive to said clock signals which respectively count said signals incrementally and decrementally,
3. gates coupling said counters for transferring the count registered in said first counter to said second counter when enabled, and b. a missing reply signal control unit for providing a synthetic reply pulse when said second counter is decremented to a zero count, and c. an input control unit responsive to said reply pulse, said interrogation pulse and said synthetic reply pulse for controlling the interval of time during which said clock pulses are transferred to said counters and for enabling said gates at the end of each of said dwells.

10. The invention as set forth in claim 9, wherein said calculation unit includes means for reading out the count registered in said first counter when enabled and also including an acquisition control unit comprising a counter having means for incrementing and decrementing the count registered therein, means for applying said reply pulses to said counter for incrementing said count registered therein in response to said reply pulses, means for decrementing said count registered therein in response to said synthetic reply pulses, and means responsive to the storage in said counter of a predetermined number of counts for enabling said readout means.

11. The invention as set forth in claim 10, including a range gate control unit for transmitting said reply pulses to said input control unit when enabled means operated by said second counter for enabling said range gate control unit when said second counter is decremented to register a predetermined number of counts, means included in said range gate control unit for inhibiting said control unit in response to said synthetic reply pulse, and means for preventing inhibition of said range gate control unit when said counter in said acquisition control unit has a zero count stored therein.

12. The invention as set forth in claim 10, including a range gate control unit for transmitting said reply pulses to said input control unit when enabled, means operated by said second counter for providing a plurality of output pulses each respectively when said down counter is decremented to a different number of counts, a synthetic reply pulse counter responsive to said synthethic reply pulses for counting said synthetic reply pulses, means coupled to said synthetic reply pulse counter for transmitting different ones of said plurality reply pulses to said range gate control unit for enabling said reply pulse control unit when different counts are stored in said synthetic reply pulse counter, means responsive to a reply pulse transmitted by said range gate control unit, for resetting said synthetic reply pulse counter, and means in said reply pulse control unit responsive to a synthetic reply pulse for inhibiting said reply pulse control unit.

13. The invention as set forth in claim 9, wherein said calculation unit includes a storage register, and wherein said calculation unit also includes transfer gates for reading out the count stored in said first counter into said storage register at the end of each dwell, a lost signal counter coupled to said first counter for resetting said storage register when said first counter has reached a predetermined number of counts and a plurality of successive dwells.

14. A system for calculating the range between craft which are in radio communication with each other, one of which repetitively transmits interrogation pulses and the other of which transmits reply pulses in response thereto, said reply pulses and interrogation pulses occurring in successive dwells, said computer comprising
   a. a calculation unit including
      1. an up counter which counts incrementally pulses applied thereto,
      2. a down counter which counts decrementally pulses applied thereto,
      3. gate means for transferring the count registered in said up counter to said down counter,
   b. a source of clock pulses repetitive at intervals corresponding to increments of said range,
   c. means coupled to said down counter for producing a filler pulse when said counter is decremented to a certain count,
   d. an input control unit including
      1. gate means for transmitting said clock pulses to both said up counter and down counter when enabled,
      2. time error detector means responsive to said filler pulses and said reply pulses for providing an output corresponding to the sense and magnitude of the difference of the time of occurrence of said reply pulses and said filler pulses,
      3. means for enabling said gate means upon occurrence of each of said interrogation pulses and inhibiting said gate means upon occurrence of each of said filler pulses, and
      4. variable delay means coupled at least to said enabling means for said up counter gate means controlled by said output for controlling the times of operation of said enabling means,
   e. means responsive to said filler pulses for enabling said calculation unit gate means upon occurrence thereof.

15. The invention as set for the in claim 14, wherein said input control unit includes integrating means responsive to said output for integrating said output over a predetermined number of dwells.

* * * * *